(12) United States Patent
Huston et al.

(10) Patent No.: US 6,276,922 B1
(45) Date of Patent: Aug. 21, 2001

(54) CORE FLUID VELOCITY INDUCER

(75) Inventors: David Robert Huston, Rosemont; Tiemo Brand, North York; Ali R. Mortazavi, Richmond Hill, all of (CA)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/382,416

(22) Filed: Aug. 24, 1999

(51) Int. Cl.[7] ............................. B29C 49/64; B29C 45/72
(52) U.S. Cl. .................... 425/547; 425/526; 425/548; 425/552
(58) Field of Search ......................... 425/526, 547, 425/548, 552

(56) References Cited

U.S. PATENT DOCUMENTS

| | | | | |
|---|---|---|---|---|
| 3,109,198 | * | 11/1963 | Guignard | 264/294 |
| 3,196,198 | * | 7/1965 | Rex | 264/328.16 |
| 3,760,874 | * | 9/1973 | Bokovic | 165/177 |
| 4,091,069 | * | 5/1978 | Allen | 264/328.16 |
| 4,208,177 | | 6/1980 | Allen . | |
| 4,592,719 | * | 6/1986 | Bellehache et al. | 425/526 |
| 4,667,729 | * | 5/1987 | Zecman | 164/312 |
| 4,911,636 | * | 3/1990 | Gellert | 425/549 |
| 4,966,544 | | 10/1990 | Mitake . | |
| 5,068,065 | * | 11/1991 | Maus et al. | 264/1.3 |
| 5,114,655 | * | 5/1992 | Cole | 264/318 |
| 5,498,150 | * | 3/1996 | Check | 425/526 |
| 5,571,470 | | 11/1996 | Plester . | |
| 5,582,788 | | 12/1996 | Collette et al. . | |
| 5,631,030 | | 5/1997 | Brun et al. . | |
| 6,077,067 | * | 6/2000 | Gellert | 425/552 |
| 6,079,972 | * | 6/2000 | Gellert | 425/552 |

OTHER PUBLICATIONS

The book entitled Mold Engineering, published by Hanser/Gardner publications, written by Herbert Rees, copyright 1995.
Product literature posted on the internet website for Choice Mold Components Incorporated on Jul. 12, 1999.

* cited by examiner

Primary Examiner—Nam Nguyen
Assistant Examiner—Emmanuel S. Luk
(74) Attorney, Agent, or Firm—Bachman & LaPointe, P.C.

(57) ABSTRACT

The technical field of the invention broadly relates to injection molding systems and more particularly to cooling of a core used in a mold of an injection molding machine. Cooling a core involves supplying coolant through a lengthwise supply tube that extends within a hollow bore formed in the core. The coolant flows through the supply tube, exiting as a stream of fluid at an open end of the supply tube where the stream contacts a substantially perpendicular inner surface of the core. The stream of fluid is initially deflected by this inner surface on an axis perpendicular to an axis of the original flow producing a stagnation zone in the stream having zero or relatively low velocity. The stagnation zone is adjacent to a high heat gate area and results in poor cooling of the core tip. The invention solves the problem of stagnation by application of a fluid velocity inducer. The fluid velocity inducer is located in the entry stream path of the fluid inducing a velocity thus reducing or eliminating the stagnation zone and improving the cooling of the core.

33 Claims, 8 Drawing Sheets

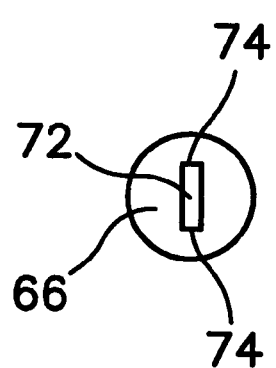
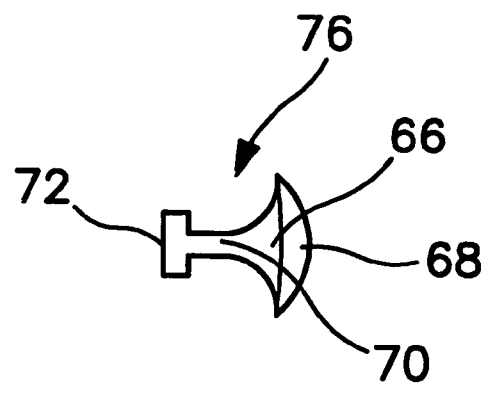
FIG. 9a  FIG. 9b
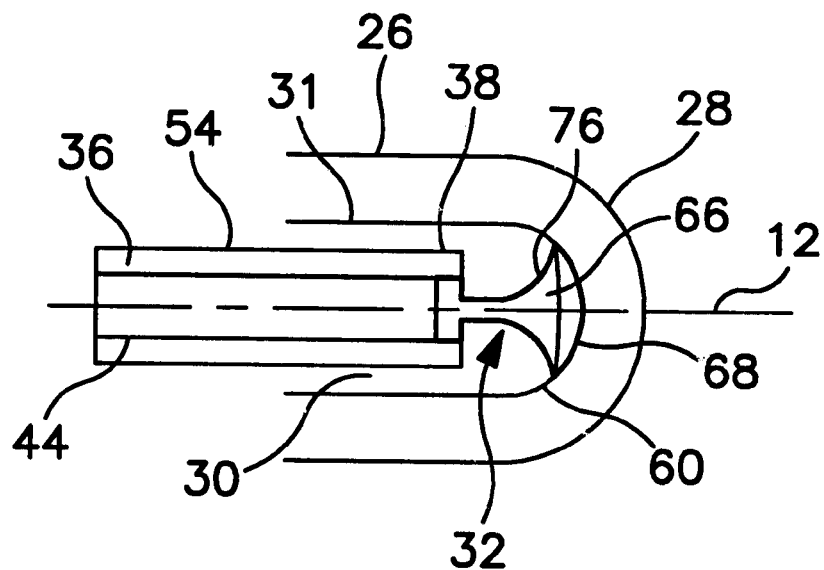
FIG. 10

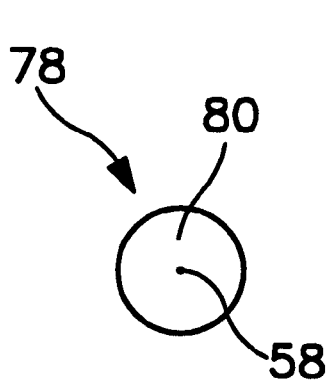
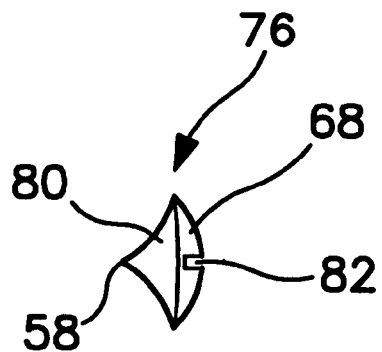
FIG. 11a     FIG. 11a
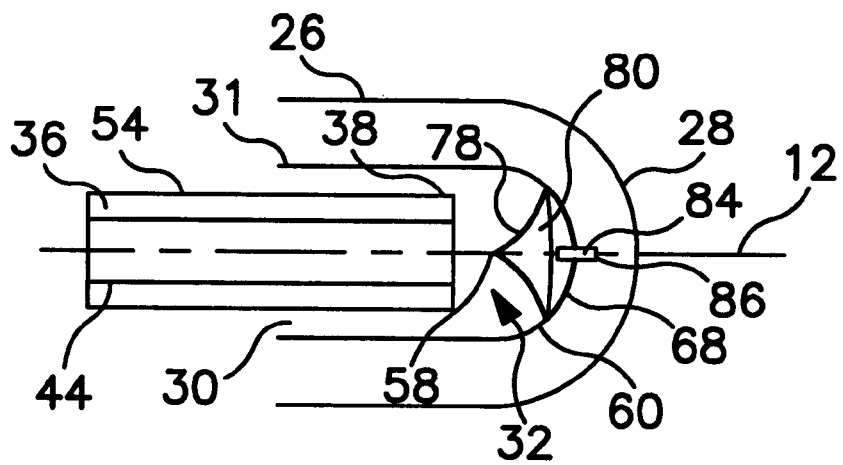
FIG. 12

CORE FLUID VELOCITY INDUCER

FIELD OF THE INVENTION

The present invention relates to injection molding systems and more particularly, the invention relates to cooling of mold cores used in an injection molding machine for forming bottle preforms of polyethylene terephthalate (PET), polyethylene, or other injection moldable materials.

BACKGROUND OF THE INVENTION

Bottle preforms are molded in large quantities and minimizing the molding cycle time is critical to commercial viability of the system. Formed bottle preforms must be adequately cooled down to a sufficient temperature to allow their release from the mold without surface damage or physical distortion due to warping, or to avoid crystallization of the cooling melt of plastic. The rate of cooling the bottle preform is a major factor in determining overall cycle time.

In the field of injection molding, cooling a formed bottle preform located on a core is very well known and commonly used in industry.

For example, U.S. Pat. No. 5,571,470 entitled "Method for Fabricating a Thin Inner Barrier Layer within a Preform" issued to the Coca-Cola company on Nov. 5, 1996 and discloses a conventional apparatus for cooling formed bottle preforms. An elongate core rod is shown having an lengthwise inner channel. Cooling fluid circulates in the lengthwise inner channel for cooling the formed preform.

U.S. Pat. No. 5,582,788 entitled "Method of Cooling Multilayer Preforms" issued to Contentional PET Technologies Inc. on Dec. 10, 1996 and discloses a conventional apparatus for cooling formed bottle preforms. A cylindrical core is shown inserted within a mold cavity, including a formed bottle preform. The cylindrical core includes a lengthwise bore to receive circulating water within the interior of the core to cool the formed bottle preform during operation.

The book entitled "Mold Engineering" published by Hanser/Gardner publications, written by Herbert Rees, copyright 1995, describes bubbler mold cooling and baffle assist mold cooling on page 298.

An elongated core having a lengthwise bore is cooled through a bubbler and a conventional cooling medium. The bubbler is essentially a hollow tube having one end extending lengthwise into the lengthwise bore of the elongated core. The other end of the bubbler is connected to a inlet manifold port for supplying the cooling medium. The lengthwise bore forms a mouth at the open end of the core and is connected to a exit manifold port permitting water to exit the core.

Water enters the inlet manifold port, travelling through the bubbler into the elongated core and out of the open end of the elongated core into the exit manifold port. Water leaves the open end of the bubbler and contacts an inner surface of the core at a substantially perpendicular angle to the flow of cooling fluid from the bubbler.

Baffle assist mold cooling improves cooling by redirecting the flow of water along a differing path for more uniform cooling along the length of the elongated core. The example illustrates a helical path formed on the outer surface of the bubbler for directing the flow of water.

U.S. Pat. No. 4,208,177 entitled "Fluid Cooling of Injection Molded Plastic Articles" issued to Logic Devices on Jun. 17, 1980 and discloses an apparatus for cooling an injection molded plastic article. A pair of dies are illustrated, one having a mold cavity, the other having a core. The core includes a hollow chamber, inlet pipe and outlet pipe. The inlet pipe extends lengthwise into the hollow chamber towards an end plug. An outlet pipe is connected at a distant end of a side wall of the chamber. Cooling liquid circulates from the inlet pipe into the chamber and exits the outlet pipe. The cooling liquid streams from the inlet pipe and contacts a surface of the chamber at a substantially perpendicular angle to the flow of cooling fluid.

U.S. Pat. No. 5,631,030 entitled "Cooled Injection Core for an Integrated Injection Blow Mold machine" issued to Electraform Incorporated on May 20, 1997 and discloses an apparatus for creating a spiral flow path between the water inlet and the water outlet of a core. The cooling liquid leaves the inlet pipe located within a bore of a core and contacts an inner surface of the bore at a substantially perpendicular angle to the flow of cooling fluid.

U.S. Pat. No. 4,966,544 entitled "Injection Mold Having Cooling Fins" issued to Fuji Photo Film Company on Oct. 30, 1990 and discloses a series of baffles to direct the flow of coolant in a core. A core and cavity are illustrated within the disclosure. The core includes a supply port, an elongate hollow bore, and a discharge port. An elongate baffle plate is disposed lengthwise from one end of the hollow bore in close proximity of an upper end of the hollow bore. The elongate baffle separates the supply port from the discharge port and defines a flow path in the hollow bore extending between the supply and discharge ports. A pair of heat exchange ribs extend from the side walls of the hollow bore of the core in the direction of coolant flow. The coolant enters through the supply port, flows down one side of the hollow bore defined by the baffle plate, flows around the heat exchange ribs, down the other side defined by the baffle plate and the hollow bore, and out the discharge port.

Product literature posted on the internet web site for Choice Mold Components Incorporated on Jul. 12, 1999 illustrates a "Turbo Water Baffle" product for use in a core. The device provides a spiral design or helix to direct and rotate the flow of coolant in a bore of a core. The cooling liquid leaves an inlet pipe and contacts a surface of a bore formed in the core at a substantially perpendicular angle to the flow of cooling fluid before flowing to an exit port.

The aforedescribed prior art devices are prone to several problems.

It is known in the prior art that a core may be cooled by circulating a coolant such as water through a central bore formed in the core. However, heat removal across the elongate core is not uniform. For example, as a melt of hot plastic travels through the mold gate, it shears, which results in additional heat. During a packing cycle, the gate region is the last area having a melt injected. As such, the hottest area of the core is the semispherical end nearest the mold gate. Crystallization may occur near the mold gate as a result of slow cooling in the crystallization temperature range affecting the quality of the molded part. Conventional prior art approaches to circulating a coolant do not address the high heat gate area of the core which result in relatively long cycle times.

It is also known in the prior art that baffles may be applied for re-directing the flow of cooling fluid along a different path to produce a more uniform cooling over the elongate body. Again, the prior art baffles do not teach or provide a solution that addresses cooling the high heat area of the core near the gate.

The prior art baffle devices add additional cost and complexities to the core, and require a relatively long cooling cycle time.

It is also known in the prior art that an inlet pipe may be centrally located within the bore of the core to deliver the cooling fluid into the bore. The stream of fluid contains a stagnation area at the high heat area of the core where the fluid cannot move and effectively remove heat from the core. This results in slower cooling and a relatively long cycle time.

It is also known that if the heat transfer characteristics could be improved by a core cooling device, then the bottle preform molding cycle time could be reduced leading to increased production.

Therefore, it is desirable to provide an invention which overcomes the aforedescribed problems of the prior art.

SUMMARY OF THE INVENTION

There is a need for improving the heat transfer characteristics for cooling a core and for improving an injection molding cycle time. There is also a need to improve the flow of coolant in a stagnation zone near the high heat area of a core tip.

The present invention finds particular advantage in improving the convection heat transfer of a coolant by inducing a velocity in the coolant in a stagnation zone. By improving the flow of coolant the convection heat transfer characteristics are improved.

The present invention also finds advantage in improving the conduction heat transfer of a core tip by increasing the projected surface area of the core tip in a coolant circulation area. The projected surface area has a primary conductive surface and a secondary conductive surface. The additional surface area also leads to improve the convective heat transfer characteristics.

The present invention also finds advantage by improving the cooling of a core tip near a high heat area of a gate.

The present invention also finds advantage by reducing or eliminating a coolant stagnation zone formed in a core tip.

The present invention also finds advantage by having the capability of being formed during a bore making process. The bore must be formed in a new core and by making the profile of a velocity inducer at the end of a drill bit, the velocity inducer may be made in the same process as the bore. Alternatively, the velocity inducer may be made separately for use in refitting an existing core.

In accordance with a primary broad aspect of the present invention, there is provided a core for use in an injection molding system. The core comprises a first channel, a second channel, a circulation area, and a velocity inducer. The circulation area is for receiving an entry flow of coolant from the first channel, circulating the coolant in the circulation area cooling the core, and circulating the coolant to the second channel for directing an exit flow of coolant. The velocity inducer is disposed in a flow path of the entry flow of coolant for inducing a velocity in the coolant for circulating the coolant in the circulation area.

The velocity inducer, in the preferred embodiment, is formed on a bore inner tip surface of the core and is in axial alignment with the first channel about a central longitudinal axis. The velocity inducer further comprises a velocity inducing surface that extends outwardly from a bore inner tip surface into a circulation area.

The velocity inducing surface further comprises a primary conductive surface for conductive heat transfer through a core material to a coolant. The velocity inducing surface further comprises a secondary conductive surface for conductive heat transfer through the core to the coolant. The secondary conductive surface, in an embodiment of the invention, is a plurality of heat conductive fins extending outwardly from the velocity inducing surface into the circulation area and parallel to the flow of coolant.

In an embodiment of the invention, the velocity inducer includes a holder extending outwardly from an apex of the velocity inducing surface and includes a conduction surface for heat conducting engagement with the bore inner tip surface such that the velocity inducer is secured within the circulation area by the holder in contact with an end of the first channel. In another embodiment of the invention, the velocity inducer includes an engagement conduction surface for heat conducting engagement with the bore inner tip surface such that the conduction surface is secured to the bore inner tip surface retaining the velocity inducer within the circulation area.

In the preferred embodiment, the velocity inducing surface is a straight sided cone. In an alternative embodiment of the invention, the velocity inducing surface in a concave sided cone.

In accordance with a second broad aspect of the present invention, there is provided a mold core plate assembly for use in an injection molding system. The mold core plate assembly comprises a coolant source manifold, a coolant drain manifold, a core, a first channel, a second channel, a circulation area, and a velocity inducer. The first channel is connected to the coolant source manifold, extending into a bore of the core for directing an entry flow of coolant into the core. The second channel is connected to a coolant drain manifold for directing an exit flow of coolant from the core. The circulation area in the core is for circulating the coolant between the first channel and the second channel. The velocity inducer is disposed in a flow path of the entry flow of coolant for inducing a velocity in the coolant for circulating the coolant in the circulation area. In an embodiment of the invention, the first channel for directing an entry flow of coolant is a bubbler having a first opening for connecting with the source manifold for receiving the coolant, and the bubbler having a second opening for streaming the coolant into the circulation area. In an embodiment of the invention, the second channel is formed by an outer surface of the bubbler and a side wall surface of a lengthwise axial ore in the core and the second channel includes a mouth for connecting with the drain manifold. The mold core plate assembly further comprises a plurality of cores.

In accordance with a third broad aspect of the present invention, there is provided an injection molding system. The injection molding system comprises an injection unit for plasticising and injecting a melt of plastic, a mold for defining a part, a clamp unit for opening, closing, and clamping the mold, a coolant source manifold, a drain manifold, a core mounted to the mold core plate assembly by a lock ring, a first channel, a second channel, a circulation area, and an velocity inducer. The mold includes a mold core plate assembly and a mold cavity plate assembly. The mold core plate assembly includes a coolant manifold and a coolant drain manifold. The coolant source manifold includes a source connector for connection to a conduit for supplying coolant to the mold core plate assembly. The drain manifold includes a drain connector for connection to another conduit for removing coolant from the mold core plate assembly. The first channel is connected to the coolant source manifold, extending into a bore of the core for directing an entry flow of coolant into the core. The core includes a second channel connected to the coolant drain manifold for directing an exit flow of coolant from the core. The circulation area circulates the coolant between the first channel and the second channel. The core includes a velocity inducer disposed in a flow path of the entry flow of coolant for inducing a velocity in the coolant for circulating the coolant in the circulation area.

The injection molding system further comprises a coolant chiller connected to the conduit for supplying coolant to the source manifold and the chiller connected to another conduit for receiving coolant from the drain manifold.

While the core described herein is for making a PET bottle preform, it is understood by those skilled in the art that the core shown can be adapted for other types of articles when the mold cavity and core exterior molding surface are changed.

BRIEF DESCRIPTION OF THE DRAWINGS

For a better understanding of the nature and advantages of the present invention reference may be had to the accompanying diagrammatic drawings in which:

FIG. 9a is a top view of a bubbler secured velocity inducer, FIG. 9b is a side view of a bubbler secured velocity inducer, FIG. 10 is an enlarged cross sectional view taken along line B—B of FIG. 1 showing an end of an elongate preform body area illustrating placement of the bubbler secured velocity inducer, FIG. 11a is an top view of a mechanically secured velocity inducer, FIG. 11b is a side view of a mechanically secured velocity inducer, FIG. 12 is an enlarged cross sectional view taken along line B—B of FIG. 1 showing an end of an elongate preform body area illustrating placement of the mechanically secured velocity inducer.

DETAILED DESCRIPTION OF THE PREFERRED EMBODIMENT

Figure 1:
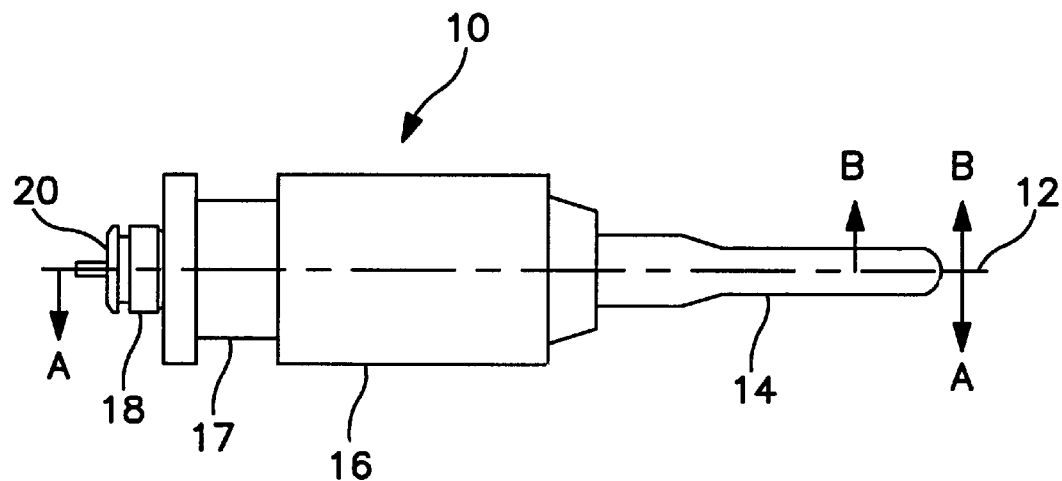
FIG. 1 is a side view of a preform core.

The present invention is described with reference to FIG. 1. A core 10 for use in a mold is illustrated having a central longitudinal axis 12. The core 10 includes an exterior molding surface generally indicated at 14. The molding surface 14 defines the inside shape of a plastic bottle preform (not shown) manufactured in an injection molding machine. A cylindrical core body is generally indicated at 16. The exterior molding surface 14 is formed on one end of the cylindrical core body 16 and a core lock 17 is formed on the other end of the core body 16. The core lock 17 tightly secures the core 10 to a mold (not shown) through a conventional and complimentary lock member (not shown) that bolts to the mold. Formed on the end of the core lock 17 is a coolant connector 18. The coolant connector provides tight sealing engagement, typically to a manifold located in the mold, and has an opening 20 that allows an entry and exit flow of coolant.

It is understood by those skilled in the art that the preferred material for the core 10 is steel. Alternatively, the core 10 may be stainless steel, or tungsten carbide, or beryllium copper, and may include a coating of titanium nitride.

It is further understood by those skilled in the art that the preferred coolant is chilled water. Alternatively, a fluid such as water mixed with rust inhibitors, or a gas, or oil, or hot water, may be applied as coolant to cool the core as long as the coolant is supplied at a temperature lower than the hot molded material.

Figure 2:
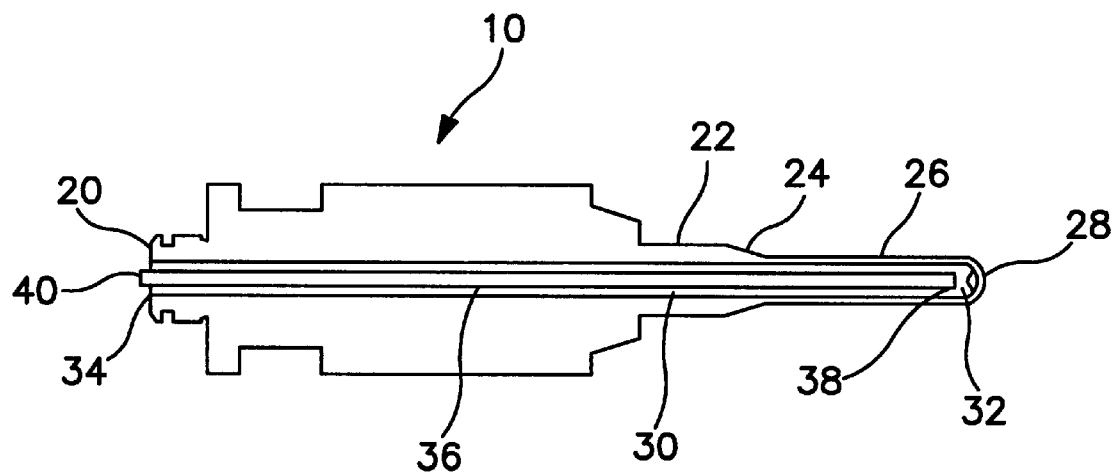
FIG. 2 is a cross sectional view of a preform core taken along the line A—A of FIG. 1 showing a central bore and bubbler.

Referring now to FIG. 1 and FIG. 2, a cross sectional view is shown in FIG. 2 taken along the line A—A of FIG. 1. The molding surface 14 includes a neck finish region 22, an elongate preform body area 26, and a semispherical core tip 28. A taper region 24 transitions and extends between the neck finish region 22 and the elongate preform body area 26. The semispherical core tip 28 is formed on an end of the elongate preform body area 26.

The core 10 includes a central lengthwise bore 30 extending from the opening 20 through the core 10 to a distant end at the core tip 28. It is understood by those skilled in the art that the bore 30, neck finish region 22, taper 24, body 26 and core tip 28 define a thickness of metal with the bore 30 having suitable strength properties and suitable thermal heat transfer properties for injection molding of a bottle preform. The bore 30 is formed typically in a manufacturing process by a drilling machine.

A bubbler 36 extends along the central longitudinal axis 12 from the opening 20 towards the semispherical core tip 28. The bubbler 36 is a length that extends and ends at a distance above an inner wall of the bore 30 at a circulation area 32 that permits circulation and flow of the coolant over the inner wall of the bore near the semispherical core tip 28. The bubbler 36 is essentially a hollow tube that provides for a channeled flow of coolant. The bubbler is securely mounted in the mold (not shown) and connected to a manifold located in a mold (not shown). The bubbler 36 and the core 10 are mounted on the mold for central axial placement of the bubbler 36 within the central lengthwise bore 30 of the core 10.

The bore 30 includes a mouth 34 for passing a flow of coolant. The bubbler 36 includes a first opening 40 and a second opening 38.

Preferably, coolant enters the bubbler 36 at the first opening 40. The coolant travels the length of the bubbler 36 and exits the bubbler at the second opening 38 into the circulation area 32 as a stream of coolant. The coolant circulates in the circulation area 32 and flows down the central lengthwise bore 30 and exits at the mouth 34.

Alternatively, coolant may enter the mouth 34, flowing down the central lengthwise bore 30 to the circulation area 32 where the coolant circulates and enters the second opening 38 of the bubbler 36. The coolant travels the length of the bubbler 36 and exits at the first opening 40.

Figure 3:
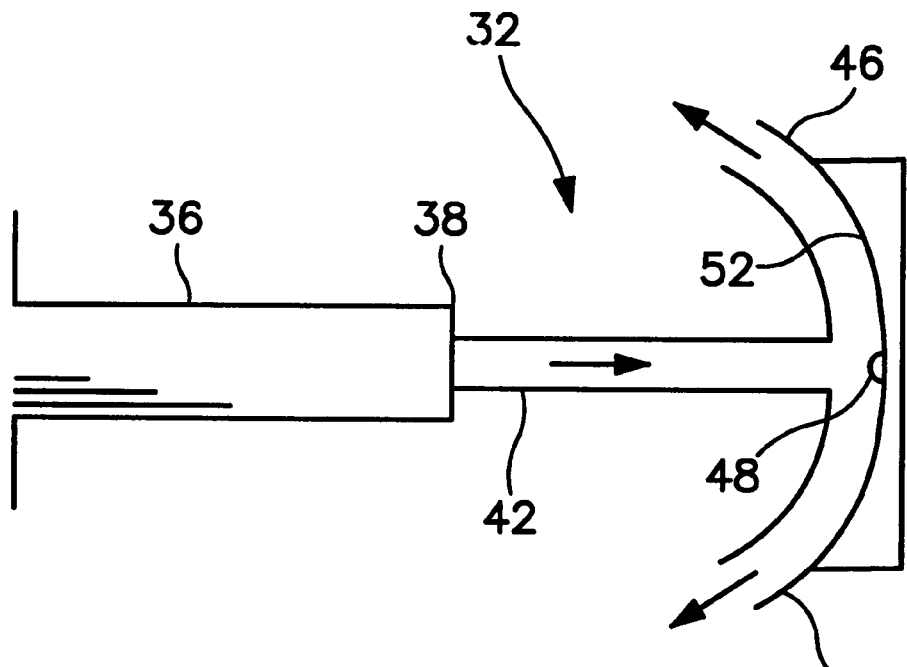
FIG. 3 is a schematic representation of a conventional circulation area illustrating a fluid stagnation zone.
Figure 4:
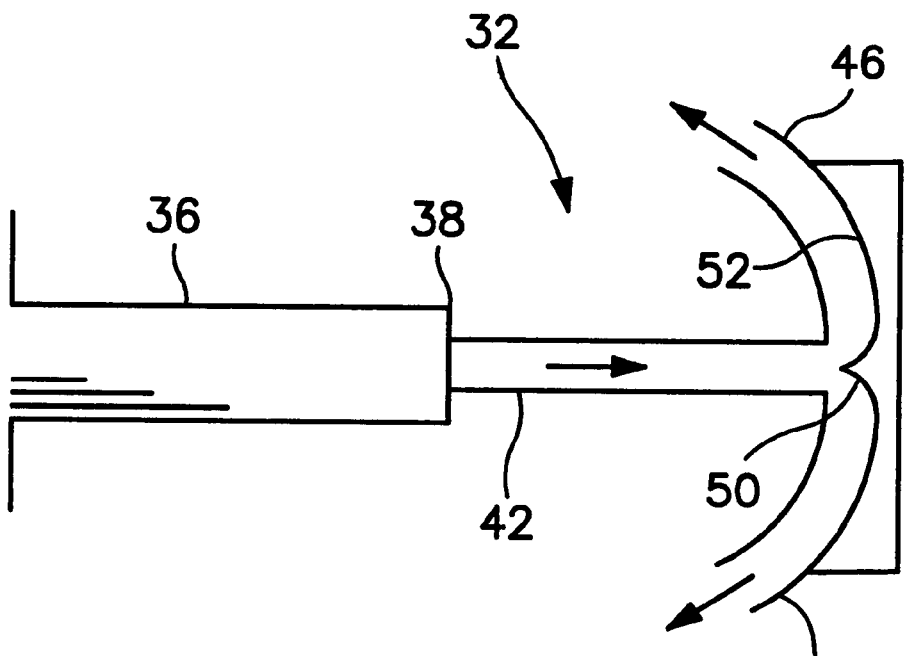
FIG. 4 is a schematic representation of a circulation area illustrating a velocity inducer.

Referring now to FIG. 3 and FIG. 4, an enlarged schematic representation of the circulation area 32 is shown. FIG. 3 illustrates a coolant stagnation zone 48 and FIG. 4 illustrates the velocity inducer 50. A bubbler 36 delivers a main stream 42 of coolant to the circulation area 32 through the second opening 38 of the bubbler 36. The main stream 42 contacts the conventional curved surface 52 at a substantially perpendicular angle and deflects the main stream 42 into a circulated stream 46.

It is appreciated by those skilled in the art that the illustrated stream vectors for the main stream 42 and the circulated stream 46 are generalized representations of coolant flow.

A stagnation zone 48 exists as shown in FIG. 3. A stagnation zone 48 for the purposes of the present invention is an area wherein the velocity of the coolant is zero, and/or the velocity of the coolant is relatively low compared to the velocity of the coolant within the overall circulation area 32.

The stagnation zone 48 is located in an area of the tip 28 adjacent a gate (not shown). This area of the tip 28 is the hottest area of the core as a result of shearing the plastic through the gate and packing. Shearing the plastic at the gate introduces additional heat. Packing the mold maintains heat and results in prolonging the time for cooling. Coolant requires a movement or velocity to convectively remove heat from the core. The combination of the hottest area of the core and the stagnation zone 48 result in a relatively long cycle time to cool this area of the core.

A velocity inducer 50 is shown in FIG. 4. The velocity inducer 50 removes the stagnation zone 48. With an increase in the movement or velocity of the coolant, heat may be more effectively removed from the hottest area of the core resulting in an improved and relatively shorter cycle time to cool this area of the core.

Figure 5:
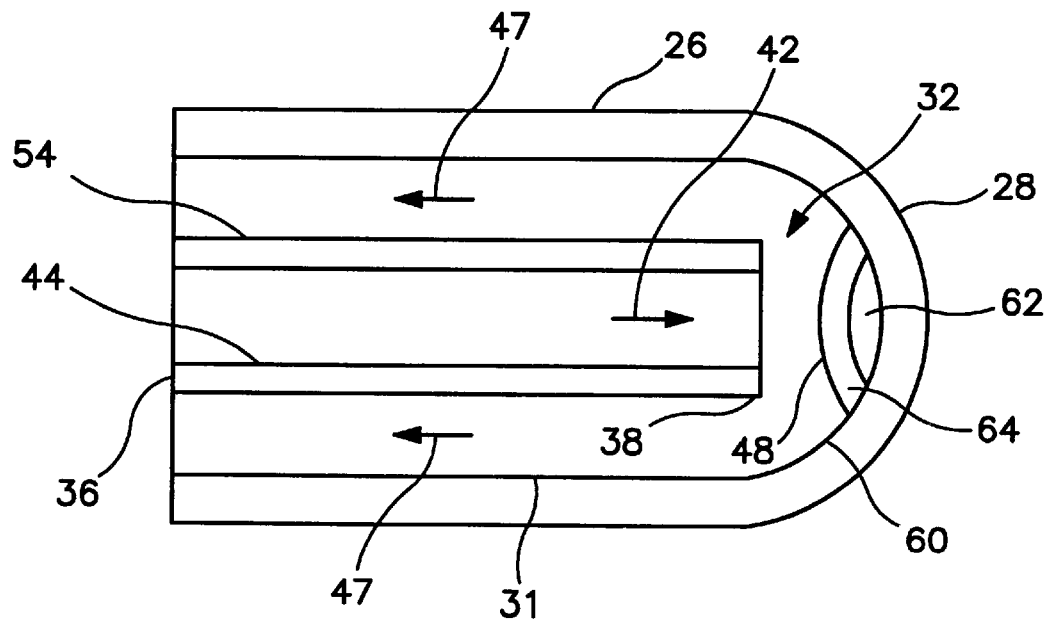
FIG. 5 is an enlarged cross sectional view showing an end of a conventional elongate preform body area illustrating fluid velocity simulation test results for a stagnation area.
Figure 6:
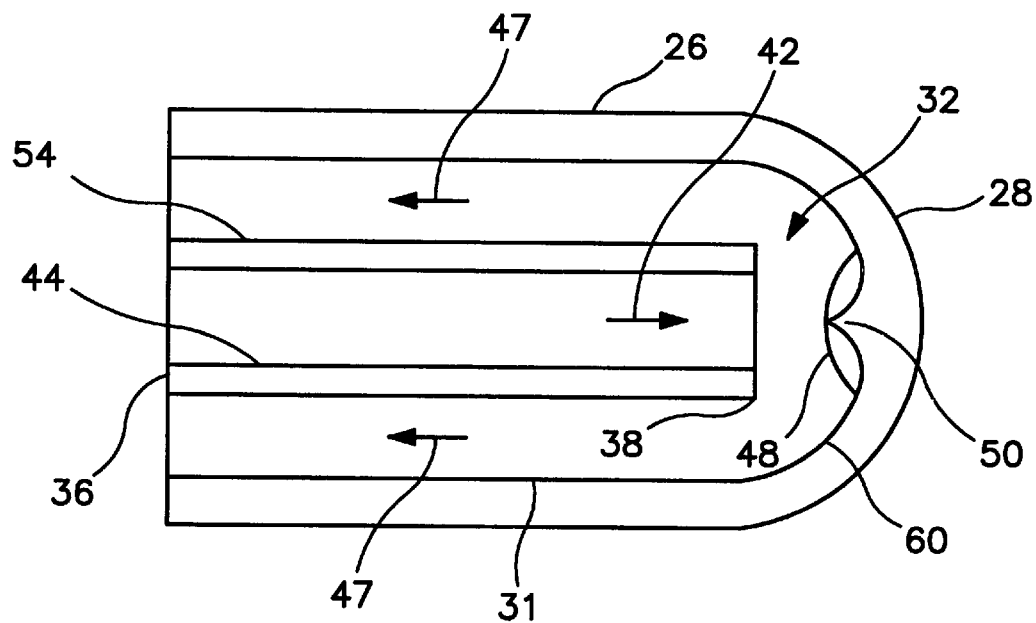
FIG. 6 is an enlarged cross sectional view showing an end of an elongate preform body area including a velocity inducer illustrating our fluid velocity simulation test results for the velocity inducer.

Referring now to FIG. 5, and FIG. 6, an enlarged cross sectional view of an end section of the elongate preform body area 26 is shown illustrating the results of our computer simulation test in the area of a stagnation zone 48, before a velocity inducer 50 (FIG. 5) and after a velocity inducer 50 (FIG. 6).

The bubbler 36 has an inner surface 44 and an outer surface 54. The inner surface 44 of the bubbler 36 is cylindrical and forms a first channel to direct a flow of coolant. The outer surface 54 of the bubbler 36 and the side wall surface 31 of the bore 30 form a second channel to direct a second flow of coolant. The side wall surface 31 of the bore 30 transitions into a semispherical bore inner tip surface 60 at the semispherical core tip 28 to define the circulation area 32.

Our computer simulation test was achieved through a software computer program for Computational Fluid Dynamics. The software is known as SASID version 5.4 by Ansys Incorporated. A partial half section of a core 10, including a circulation area 32, and a half section of a bubbler 36 including an inner surface 44 and outer surface 54 was simulated to produce a coolant velocity vector profile.

The maximum velocity of the entry flow 42 of coolant within the bubbler 36 was 11,009 mm/s. The average velocity of the entry flow 42 was 10,222.5 mm/s.

The maximum velocity of the exit flow 47 of coolant between an outer surface 54 of the bubbler 36 and the side wall surface 31 of the bore 30 was 6291 mm/s. The average velocity of the exit flow 47 of coolant was 4718 mm/s.

Referring now to FIG. 5, the stagnation zone 48 contained two velocity profiles. The first velocity profile generally indicated at 62 located the furthest from the second opening 38 of the bubbler 36 and nearest the bore inner tip surface 60 was 0 mm/s. The second velocity profile generally indicated at 64 located nearest the second opening 38 of the bubbler 36 and adjacent the first velocity profile 62 was 1573 mm/s, a relatively low velocity.

Referring now to FIG. 6, the velocity profile, as a result of the velocity inducer 50, over the entire stagnation zone 48 as defined by the first and second velocity profiles was increased to 6291 mm/s. Therefore, the first velocity profile 62 had a velocity increase of 6291 mm/s and the second velocity profile 64 had a velocity increase of 4718 mm/s.

Figure 7:
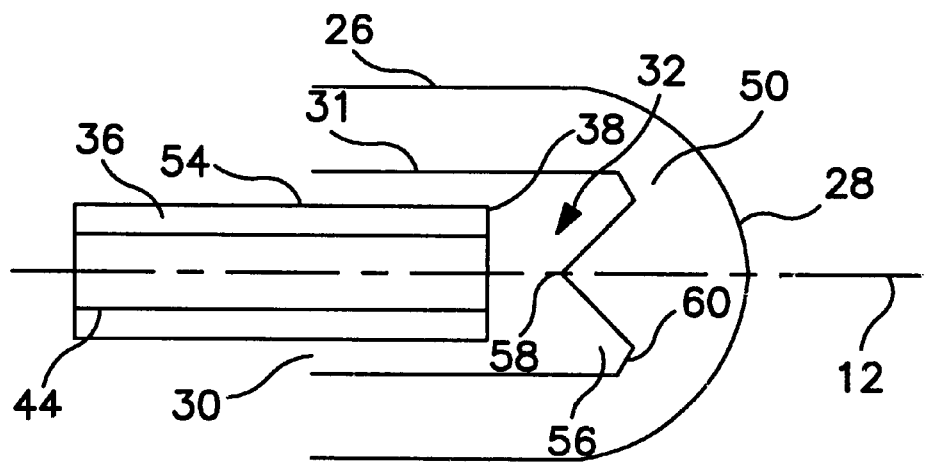
FIG. 7 is an enlarged cross sectional view taken along line B—B of FIG. 1 showing an end of an elongate preform body area illustrating the preferred embodiment of the velocity inducer.

Referring now to FIG. 7 the preferred embodiment of the present invention is described. An end portion taken along line B—B of FIG. 1 of an elongate preform body area 26 and semispherical core tip 28 is shown with a bubbler 36 disposed about the central longitudinal axis 12. The elongate preform body area 26 includes a central lengthwise bore 30.

A velocity inducer 50 is formed at the distant end of the bore 30 in the area of the semispherical core tip 28. The velocity inducer 50 is substantially conical having a velocity inducing surface 56. The apex 58 is disposed on the central longitudinal axis 12 at a height above the bore inner tip surface 60 and the velocity inducer is symmetrical about the axis 12. Alternatively, the velocity inducer may be asymmetrical, for example, in the case of an asymmetrical flow of coolant. The velocity inducer 50 is formed in the same material as the core 10. The velocity inducer 50 extends outwardly from the bore inner tip surface 60 into the circulation area 32.

Heat transfer from the hot molten material (not shown) in contact with the exterior molding surface 14 (FIG. 1) to the coolant in the core 10 occurs due to a combination of conductive and convective heat transfer. Heat conduction in the solid core material and forced convection in the coolant. Forced convection is coolant motion produced by a mechanical means, for example a coolant pump which circulates coolant through the core.

Heat conduction is the transfer of heat through a solid material from a region of higher temperature to a region of lower temperature. Heat conduction in the core 10 is governed by Fourier's Law Of Conduction which states the rate of change of heat transfer over time is equal to the thermal conductivity of the solid material, multiplied by the area, multiplied by the rate of change of temperature divided by the thickness of the solid material.

Increasing the overall thickness of the solid material lowers the rate of heat transfer through the material. Although the velocity inducer 50 increases the thickness of the solid material of the semispherical core tip 28 along the central axis 12, it also increases the heat conductive surface area of the solid material along the velocity inducing surface 56. As such, the ratio of area to thickness increases, resulting in an increased or improved conductive heat transfer through the solid material.

The increased surface area of the velocity inducing surface 56 provides a primary conductive surface for conductive heat transfer from the hot molten material on the exterior molding surface to the coolant metal interface. The coolant metal interface is defined by the side wall surface 31, bore inner tip surface 60, and the velocity inducing surface 56 of the core 10.

Heat convection is the transfer of heat in a liquid through a gross motion of the liquid. Heat convection in the coolant is governed by Newton's Law Of Cooling which states the rate of change of heat transfer over time is equal to the heat transfer coefficient multiplied by the area, multiplied by the temperature differential (the temperature of the solid material minus the temperature of the fluid). The heat transfer coefficient of the fluid depends on properties of the fluid and the velocity of the fluid.

The velocity inducer 50 increases the velocity of the coolant, specifically in the area of a stagnation zone. By increasing the velocity of the coolant, the heat transfer coefficient of the fluid increases, resulting in an increased convective heat transfer through the coolant.

As a result, the velocity inducer improves the local heat transfer capabilities at the coolant metal interface by improving both the conductive and convective heat transfer rates.

It is understood by persons skilled in the art that the opening 38 of the bubbler 36 is disposed at a height above the velocity inducing surface 56 such that a velocity is induced in the coolant in the circulation area. As the distance between the opening 38 and the apex 58 of the velocity inducer 50 is increased, a point is reached where the coolant velocity over the velocity inducer 50 diminishes, reducing convective heat transfer. As the height is decreased by locating the opening 38 closer to the velocity inducer 50 wherein the apex 58 extends well into the opening 38 of the bubbler 36, there is a point where the mass flow rate becomes restricted impacting the flow rate, reducing convective heat transfer. In a preferred embodiment of the invention, the apex 58 of the velocity inducer 50 extends into the opening 38 of the bubbler 36, but not to the point where the mass flow rate becomes restricted.

It is understood by persons skilled in the art that the ratio of the diameter of the bubbler 36 to the diameter of the bore 30 is such to provide a coolant mass flow rate for convective heat transfer.

Preferably, an entry stream of coolant flows within the first channel of the bubbler 36. The entry stream of coolant exits the bubbler 36 at a second opening 38 located within the circulation area 32. The coolant contacts the velocity inducing surface 56 and flows towards the bore inner tip surface 60. The bore inner tip surface 60 generally deflects the flow of coolant back in a direction opposite to the entry flow of coolant as an exit stream of coolant that flows in the second channel defined by the outer surface 54 of the bubbler 36 and the side wall surface 31 of the bore 30.

It is well understood by those skilled in the art that a bore 30 must be provided in the core 10. The bore 30 may be manufactured by a manufacturing process and drilling machine. A tip section of a drill bit may be modified to define a profile of a velocity inducer 50. The velocity inducer 50 may then be manufactured during the same manufacturing process for creating the bore 30. Alternatively, the velocity inducer 50 may be manufactured after the bore 30 is created by an additional machine and process, such as an electric discharge machine (EDM).

Figure 8:
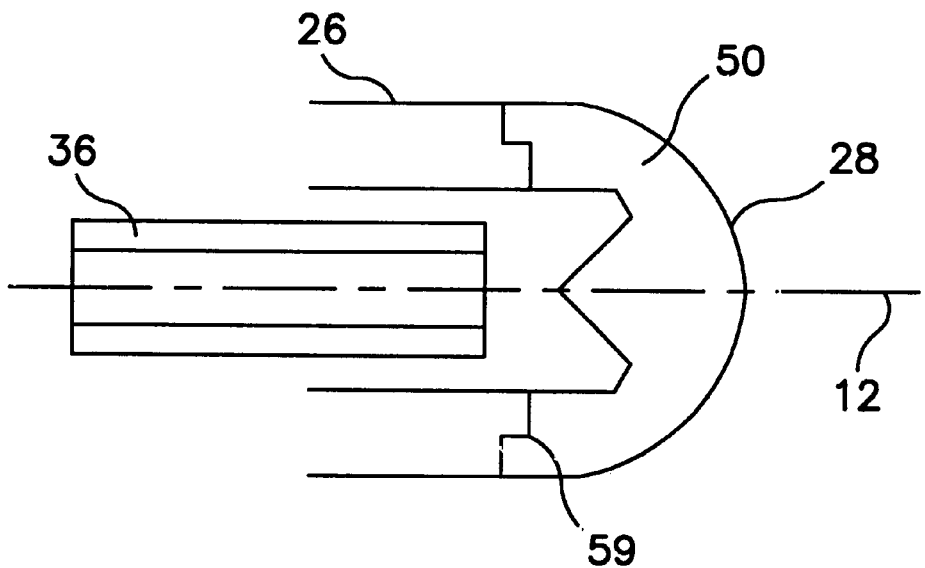
FIG. 8 is an enlarged cross sectional view taken along line B—B of FIG. 1 showing an alternative molding surface having a semispherical core tip separate from an elongate preform body area.

Referring to FIG. 8, alternatively, the semispherical core tip 28 and velocity inducer 50 may be manufactured separately from the preform body area 26 of the core 10. A separate semispherical core tip 28 has an end surface that tightly aligns and engages a complimentary end surface of the preform body area 26 forming a connection joint 59. The velocity inducer 50 is axially aligned with the bubbler 36 during assembly. The separate semispherical core tip 28 is fastened to the preform body area 26 by conventional means, for example soldered or brazed.

Referring now to FIG. 9a, FIG. 9b, and and FIG. 10, a first alternative embodiment of the present invention is described. The first alternative embodiment may be applied to either a new core, or to refit an existing core.

A bubbler secured velocity inducer is generally indicated at 76 and includes a semispherical engagement conduction surface 68 at one end providing a contact area for the bore inner tip surface 60. A substantially concave conical velocity inducing surface 66 extends upwardly from the semispherical engagement conduction surface 68. A cylindrical standoff 70 is formed at the apex of the substantially concave conical surface 66 and extends outwardly to a rectangular holder 72. The rectangular holder extends outwardly from the conical surface 66 and is aligned with the standoff 70 and the velocity inducing surface 66 about a central axis.

The velocity inducer 76 is inserted into the second opening 38 of the bubbler 36. A pair of securing surfaces 74 engage the bubbler inner surface 44 for securing the velocity inducer 76 with the bubbler 36. It is understood by those skilled in the art that the holder 72 may be press fit or brazed, or soldered to axially align and retain the velocity inducer 76 with the bubbler.

The bubbler 36 and mounted velocity inducer 76 are disposed in the bore 30 about the central longitudinal axis 12. The semispherical engagement conduction surface 68 of the velocity inducer 76 is a heat conducting surface and tightly engages the complimentary bore inner tip surface 60 for heat conducting engagement. The holder 72 shape and dimensions must secure the velocity inducer 76 to the bubbler 36 and permit a flow of coolant to exit the bubbler 36 at the second opening 38.

Alternatively, the end of the bubbler may rest on the holder 72 to secure the velocity inducer 76 with the bore inner tip surface 60.

Preferably, an entry stream of coolant flows within the first channel of the bubbler 36. The entry stream of coolant flows around the holder 72 and exits the bubbler 36 at a second opening 38 located within the circulation area 32. The coolant flows around the standoff 70 and contacts the velocity inducing surface 66 and flows towards the exposed section of the bore inner tip surface 60. The bore inner tip surface 60 generally deflects the flow of coolant back in a direction opposite to the entry flow of coolant as an exit stream of coolant that flows in the second channel defined by the outer surface 54 of the bubbler 36 and the side wall surface 31 of the bore 30.

Preferably, the bubbler secured velocity inducer 76 is manufactured out of a metal having both good heat conductive properties and good corrosion resist properties, for example copper. Alternatively, the velocity inducer 76 could be aluminum, marine brass, or steel. The velocity inducer 76 may be manufactured by grinding, machining, or casting.

Referring now to FIG. 11a, FIG. 11b, and FIG. 12, a second alternative embodiment of the present invention is described. The second alternative embodiment may be applied to either a new core, or to refit an existing core.

A mechanically secured velocity inducer is generally indicated at 78 and includes a semispherical engagement conduction surface 68 at one end providing a contact area for the bore inner tip surface 60. A groove 82 is formed about a central axis of the semispherical engagement conduction surface 68. A substantially concave conical velocity inducing surface 80 extends outwardly from the semispherical engagement conduction surface 68 to an apex 58. The semispherical engagement conduction surface 68 is a heat conducting surface for heat conducting engagement with a complimentary bore inner tip surface 60.

A second groove 86 is axially formed in the bore inner tip surface 60.

The mechanically secured velocity inducer 78 is mounted and secured in the bore 30 by the fastener 84 pressed into tight engagement with the groove 86 and tight engagement with the groove 82 in the semispherical engagement conduction surface 68.

Preferably, the mechanically secured velocity inducer 78 is manufactured out of a metal having both good heat conductive properties and good corrosion resist properties, for example copper. Alternatively, the velocity inducer 78 could be aluminum, marine brass, or steel. The velocity inducer 78 may be manufactured by grinding or machining.

Preferably, an entry stream of coolant flows within the first channel of the bubbler 36. The entry stream of coolant exits the bubbler 36 at the second opening 38 located within the circulation area 32. The coolant contacts the velocity inducing surface 80 and flows towards the bore inner tip surface 60. The bore inner tip surface 60 deflects the flow of coolant back in a direction opposite to the entry flow of coolant as an exit stream of coolant that flows in the second channel defined by the outer surface 54 of the bubbler 36 and the side wall surface 31 of the bore 30.

While the preferred embodiment of the velocity inducer 50 is shown as a substantially straight sided cone and the alternative embodiments are shown as substantially concave sided cones, it is also understood that other geometric shapes such as a parabolic shape, or semi circular shape may be used to induce a fluid velocity. The selected shape of the velocity inducer must improve the velocity of a coolant in a stagnation zone and as a result, improve the cooling profile along the coolant metal interface in the circulation area.

It is also understood that the semispherical engagement conduction surface 68 of the alternative embodiments and the complimentary semispherical shape of the bore inner tip surface 60 may include other complimentary shapes that provide a good contact area and tight engagement preventing a flow of fluid between the two surfaces and providing heat conduction.

Figure 13:
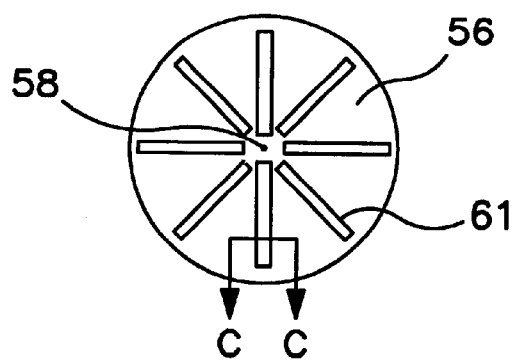
FIG. 13 is an enlarged top view of a velocity inducing surface showing a plurality of heat conductive fins.

Referring to FIG. 13, alternatively, the velocity inducing surface 56 may include a plurality of outwardly extending heat conductive fins 61. Each heat conductive fin extends from the apex 58 of the velocity inducing surface 56 towards a distant end of the velocity inducing surface 56. The heat conductive fin 61 provide a secondary conductive surface for conduction heat transfer in the circulation area.

In a preferred embodiment, each conductive fin is equally spaced about the velocity inducing surface 56, for example 45 degrees, and are parallel to the flow of coolant. The conductive fin 61 effectively increase the surface area of the velocity inducer 50 in the flow of coolant further improving the conductive heat transfer at the core tip.

Figure 14:
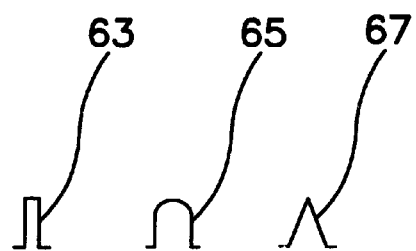
FIG. 14 is an enlarged side view taken along the line C—C of FIG. 13 showing profiles for a heat conductive fins.

Referring to FIG. 14, a sectional view taken along the line C—C from FIG. 13 illustrates different profiles for the heat conductive fins 61. For example, the profile may be rectangular 63, semi-cylindrical 65, or triangular 67, such that the surface area of the velocity inducing surface 56 increases. The heat conductive fins 61 extend outwardly into the circulation area while permitting a flow of coolant in the circulation area.

Figure 15:
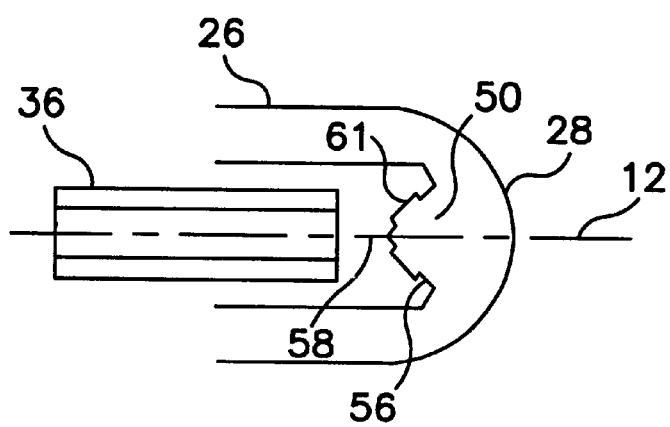
FIG. 15 is an enlarged cross sectional view taken along line B—B of FIG. 1 showing the heat conductive fins disposed upon a velocity inducing surface of a velocity inducer.

Referring to FIG. 15, a cross sectional view taken along the line B—B from FIG. 1 illustrates a rectangular 63 profile of the heat conductive fins 61 formed on the velocity inducing surface 56 of the preferred embodiment. The heat conductive fins 61 extend outwardly from the velocity inducing surface 56 into the flow path of coolant increasing the surface area of the metal at the semispherical core tip 28.

Figure 16:
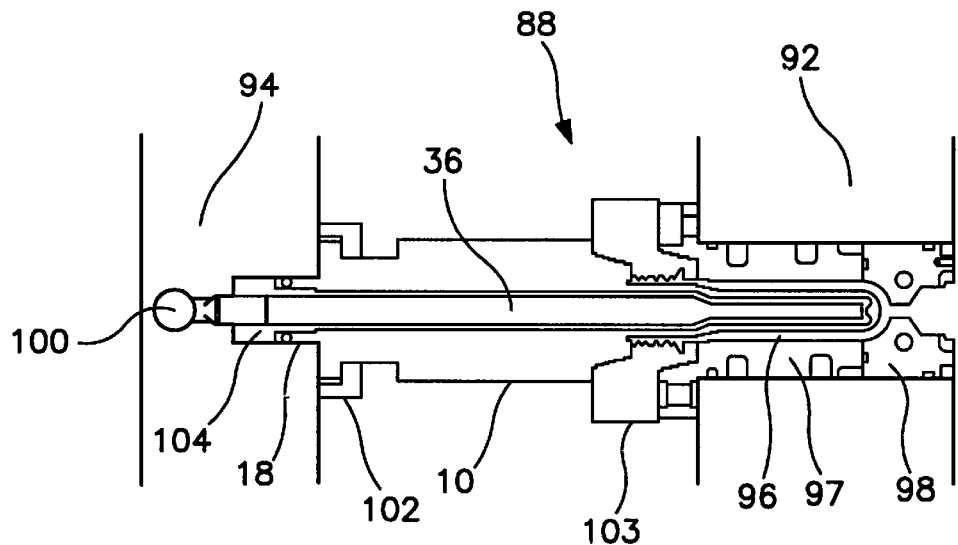
FIG. 16 is a partial cross sectional view of a core secured to a mold core plate assembly illustrating mold coolant connections for the core.

Referring now to FIG. 16, a partial sectional view of a preform stack assembly for use in a mold is generally indicated at 88. The stack includes a mold cavity plate assembly 92 and a mold core plate assembly 94.

A cavity 96 is formed in the cavity plate 92 by the gate insert 98, cavity insert 97, and neck ring 103 which collectively define the outside shape of the bottle preform. The gate insert 98 is located at an end of the cavity plate 92 for controlling the flow of hot plastic material into the cavity.

A bubbler 36 is mounted to the core plate 94 with the first opening 40 engaged and sealed with an opening in a coolant source manifold 100. The coolant source manifold 100 and bubbler 36 direct an entry flow of coolant to the core 10.

The core 10 is mounted to the core plate 94 by a lock ring 102. The bubbler 36 is axially aligned with the bore 30 of the core 10. The coolant connector 18 engages and seals with an opening in a coolant drain manifold 104. The coolant connector 18 and drain manifold direct an exit flow of coolant from the core 10.

Figure 17:
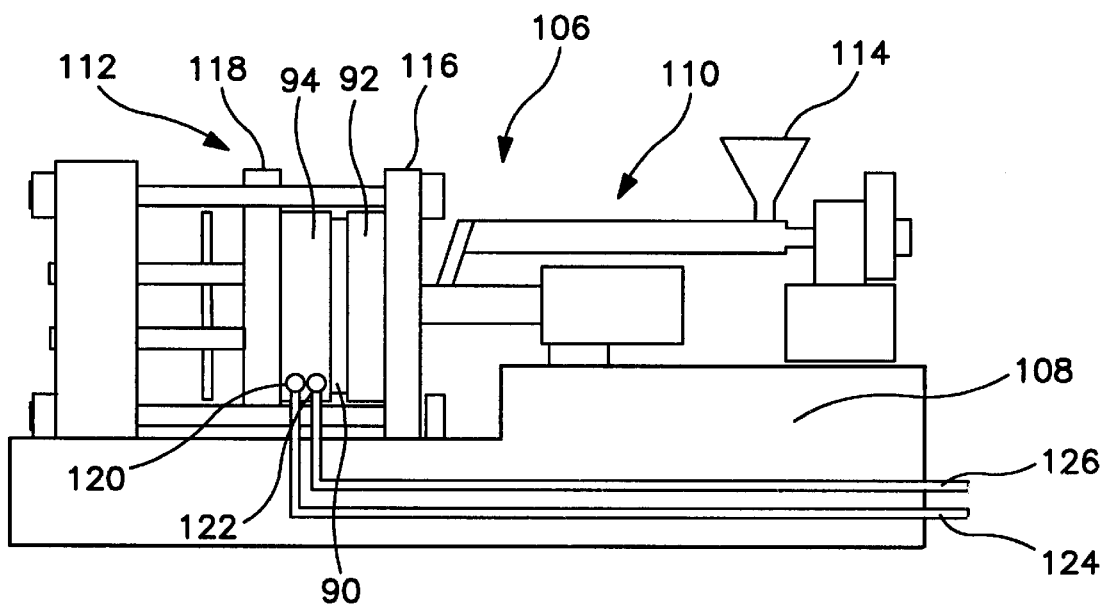
FIG. 17 is a plan view of an injection molding system including a mold and machine illustrating system coolant connections.

Referring now to FIG. 17, an injection molding system is generally indicated at 106. The injection molding system includes a base 108, an injection unit 110, a clamp mechanism 112, controls (not shown), and a mold 90. Optionally, the injection molding system 106 includes a chiller (not shown) to lower the temperature of a coolant. The base 106 typically houses the controls and electrics. The base 106 supports the injection unit 110 and the clamp mechanism 112.

The injection unit 106 receives a plastic material, for example PET, through a hopper 114. A rotating feed screw plasticizes the plastic material. The injection unit 110 also injects a melt of plastic into the mold 90.

The clamp mechanism 112 includes a stationary platen 116 and a moving platen 118. A mold core plate assembly, generally indicated at 94 (including a stripper plate, not shown) is typically mounted to the moving platen 118. A mold cavity plate assembly generally indicated at 92, (including a manifold plate, and backing plate, not shown) is typically mounted to the stationary platen 116. The mold 90 may be opened, closed, and clamped by the clamp mechanism 112.

The mold 90 includes a plurality of preform stack assemblies 88 (not shown). Each core 10 has a bubbler 36 and coolant connector 18 (as shown in FIG. 2). The mold 90 also includes a main coolant source connector 120 and a main coolant drain connector 122.

The coolant source connector 120 connects to a source conduit 124 for receiving an entry flow of coolant from a coolant supply. The coolant source connector 120 also extends into the mold through a source channel and source manifold (not shown).

The coolant drain connector 122 connects to a drain conduit 126 for directing an exit flow of coolant for heat exchange. The coolant drain connector 122 also extends into the mold through a drain channel and drain manifold (not shown). The conduits are flexible to accommodate movement of the core plate 94.

The source manifold connects to each bubbler 36 of each core 10 (see FIG. 12). The drain manifold connects to each coolant connector 18 of each core 10 (see FIG. 16).

Referring now to FIGS. 2, 7, 16, and 17, operation of the preferred embodiment is described for a single machine cycle.

The mold 90 is closed and clamped by the clamp mechanism 112. Plastic material enters the injection unit 110 through the hopper 114. The plastic material is plasticized producing a shot of hot plastic which is subsequently injected into the mold. The injection molding machine then enters a pack cycle.

Coolant enters the source conduit 124 and flows to the coolant source connector 12, into the source manifold 100, through the first channel of the bubbler 36 into the circulation area 32, onto the velocity inducer 50, through the second channel formed by the outer surface 54 of the bubbler 36 and the side wall surface 31 of the bore 30 to the drain manifold 104, to the coolant drain connector 122, and through the drain conduit 126 for heat exchange.

When the formed part is sufficiently cooled, the mold 90 is opened by the clamp mechanism 112 and the part is ejected. The machine cycle then repeats.

It is to be understood by those skilled in the art that the present invention is not limited to the illustrations described and shown herein, which are deemed to be illustrative of the preferred and alternative embodiments of the invention and may be modified without departing from the scope and spirit of the invention. The invention is intended to encompass all modifications, which are within its scope and spirit as defined by the attached claims.

We claim:

1. A core for use in an injection molding system comprising:
   a circulation area;
   a first channel;
   a second channel;
   said circulation area receiving an entry flow of coolant from said first channel, said circulation area circulating said coolant in said circulation area cooling said core, said circulation area circulating said coolant to said second channel directing an exit flow of said coolant;
   and a velocity inducer disposed in a flow path of said entry flow of coolant for inducing a velocity in said coolant for circulating said coolant in said circulation area wherein said velocity inducer including a velocity inducing surface;
   said velocity inducing surface extending outwardly from a bore inner tip surface of said core into said circulation area.

2. A core as in claim 1 wherein:
   said velocity inducing surface including a primary conductive surface for conductive heat transfer through said core to said coolant.

3. A core as in claim 2 wherein:
   said velocity inducing surface including a secondary conductive surface for conductive heat transfer through said core to said coolant.

4. A core as in claim 3 wherein:
   said secondary conductive surface is a plurality of heat conductive fins extending outwardly from said velocity inducing surface into said circulation area and parallel to said entry flow of coolant.

5. A core as in claim 4 wherein:
   said velocity inducer is formed on said bore inner tip surface of said core.

6. A core as in claim 4 wherein:
   said velocity inducer including a holder extending outwardly from an apex of from said velocity inducing surface;
   and said velocity inducer including an engagement conduction surface for heat conducting engagement with said bore inner tip surface;
   wherein said velocity inducer is secured within said circulation area by said holder in contact with an end of said first channel.

7. A core as in claim 4 wherein:
   said velocity inducer including an engagement conduction surface for heat conducting engagement with said bore inner tip surface; wherein said conduction surface is secured to said bore inner tip surface retaining said velocity inducer within said circulation area.

8. A core as in claim 4 wherein:
   said velocity inducer is in axial alignment with said first channel about a central longitudinal axis.

9. A core as in claim 8 wherein:
   said velocity inducing surface is a straight sided cone.

10. A core as in claim 8 wherein:
    said velocity inducing surface is a concave sided cone.

11. A mold core plate assembly for use in an injection molding system comprising:
    a coolant source manifold;
    a coolant drain manifold;
    a core mounted to said mold core plate assembly;
    said core including a first channel connected to said coolant source manifold and extending into a bore of said core for directing an entry flow of coolant into said core;
    said core including a second channel connected to said coolant drain manifold for directing an exit flow of coolant from said core;
    a circulation area in said core circulating said coolant between said first channel and said second channel;
    and said core including a velocity inducer disposed in a flow path of said entry flow of coolant for inducing a velocity in said coolant, circulating said coolant in said circulation area wherein said velocity inducer including a velocity inducing surface;
    said velocity inducing surface extending outwardly from a bore inner tip surface of said core into said circulation area.

12. A mold core plate assembly as in claim 11 wherein:
    said velocity inducing surface includes a primary conductive surface for conductive heat transfer through said core to said coolant.

13. A mold core plate assembly as in claim 12 wherein:
    said velocity inducing surface including a secondary conductive surface for conductive heat transfer through said core to said coolant.

14. A mold core plate assembly as in claim 13 wherein:
    said secondary conductive surface is a plurality of heat conductive fins extending outwardly from said velocity inducing surface into said circulation area and parallel to said entry flow of coolant.

15. A mold core plate assembly as in claim 14 wherein:
said velocity inducer is formed on said bore inner tip surface of said core.

16. A mold core plate assembly as in claim 14 wherein:
said velocity inducer includes a holder extending outwardly from an apex of said velocity inducing surface;
and said velocity inducer includes a conduction surface for heat conducting engagement with said bore inner tip surface;
wherein said velocity inducer is secured within said circulation area by said holder in contact with an end of said first channel.

17. A mold core plate assembly as in claim 14 wherein:
said velocity inducer includes said primary conduction surface for heat conducting engagement with said bore inner tip surface;
wherein said primary conduction surface is secured to said bore inner tip surface retaining said velocity inducer within said circulation area.

18. A mold core plate assembly as in claim 14 wherein:
said velocity inducer is in axial alignment with said first channel about a central longitudinal axis.

19. A mold core plate assembly as in claim 18 wherein said first channel for directing an entry flow of coolant is a bubbler having a first opening for connecting with said source manifold for receiving said coolant;
and said bubbler having a second opening for streaming said coolant into said circulation area.

20. A mold core plate assembly as in claim 19 wherein said second channel is formed by an outer surface of said bubbler and a side wall surface of a lengthwise axial bore in said core;
and said second channel includes a mouth for connecting with said drain manifold.

21. A mold core plate assembly as in claim 20 wherein said mold core plate assembly including a plurality of cores.

22. An injection molding system comprising:
a mold for defining a part;
an injection unit for plasticizing and injecting a melt of plastic into said mold;
a clamp unit for opening, closing, and clamping said mold;
said mold including a mold core plate assembly and a mold cavity plate assembly;
said mold core plate assembly including a coolant source manifold and a coolant drain manifold;
said coolant source manifold having a source connector for connection to a conduit for supplying coolant to said mold core plate assembly;
said drain manifold having a drain connector for connection to another conduit for removing coolant from said mold core plate assembly;
a core mounted to said mold core plate assembly;
a first channel connected to said coolant source manifold and extending into a bore of said core for directing an entry flow of coolant into said core;
said core includes a second channel connected to said coolant drain manifold for directing an exit flow of coolant from said core;
a circulation area in said core for circulating said coolant between said first channel and said second channel;
and said core including a velocity inducer disposed in a flow path of said entry flow of coolant for inducing a velocity in said coolant for circulating said coolant in said circulation area wherein said velocity inducer including a velocity inducing surface;
said velocity inducing surface extending outwardly from a bore inner tip surface of said core into said circulation area.

23. An injection molding system as in claim 22 wherein:
said velocity inducing surface includes a primary conductive surface for conductive heat transfer through said core to said coolant.

24. An injection molding system as in claim 23 wherein:
said velocity inducing surface includes a secondary conductive surface for conductive heat transfer through said core to said coolant.

25. An injection molding system as in claim 24 wherein:
said secondary conductive surface is a plurality of heat conductive fins extending outwardly from said velocity inducing surface into said circulation area and parallel to said entry flow of coolant.

26. An injection molding system as in claim 25 wherein:
said velocity inducer is formed on said bore inner tip surface of said core.

27. An injection molding system as in claim 25 wherein:
said velocity inducer includes a holder extending outwardly from an apex of said velocity inducing surface;
and said velocity inducer includes a conduction surface for heat conducting engagement with said bore inner tip surface;
wherein said velocity inducer is secured within said circulation area by said holder in contact with an end of said first channel.

28. An injection molding system as in claim 25 wherein:
said velocity inducer includes said primary conduction surface for heat conducting engagement with said bore inner tip surface;
wherein said primary conduction surface is secured to said bore inner tip surface retaining said velocity inducer within said circulation area.

29. An injection molding system as in claim 25 wherein:
said velocity inducer is in axial alignment with said first channel about a central longitudinal axis.

30. An injection molding system as in claim 29 wherein:
said first channel for directing an entry flow of coolant is a bubbler having a first opening for connecting with said source manifold for receiving said coolant;
and said bubbler having a second opening for streaming said coolant into said circulation area.

31. An injection molding system as in claim 30 wherein:
said second channel is formed by an outer surface of said bubbler and a side wall surface of a lengthwise axial bore in said core and said second channel includes a mouth for connecting with said drain manifold.

32. An injection molding system as in claim 31 wherein said mold core plate assembly includes a plurality of cores.

33. An injection molding system as in claim 32 including a coolant chiller, said coolant chiller connected to said conduit for supplying coolant to said source manifold and said coolant chiller connected to said another conduit for receiving coolant from said drain manifold.

\* \* \* \* \*